United States Patent [19]
Facey et al.

[11] Patent Number: 5,147,145
[45] Date of Patent: Sep. 15, 1992

[54] CONNECTOR FOR WIRES

[75] Inventors: Hugh D. Facey, Sheffield; Brian E. Shawcross, Cheadle Hulme, both of England

[73] Assignee: Gripple Limited, Sheffield, England

[21] Appl. No.: 469,553

[22] PCT Filed: Sep. 21, 1988

[86] PCT No.: PCT/GB88/00762
§ 371 Date: Mar. 23, 1990
§ 102(e) Date: Mar. 23, 1990

[87] PCT Pub. No.: WO89/02994
PCT Pub. Date: Apr. 6, 1989

[30] Foreign Application Priority Data
Sep. 26, 1987 [GB] United Kingdom ............... 8722683
Feb. 3, 1988 [GB] United Kingdom ............. 88022345

[51] Int. Cl.⁵ ............................................. F16G 11/00
[52] U.S. Cl. .................................... 403/314; 403/328; 403/329; 403/393; 24/136 A
[58] Field of Search ............... 403/328, 314, 393, 300, 403/374, 327, 409.1, 329; 24/136 A, 115 L, 706.8, 635

[56] References Cited

U.S. PATENT DOCUMENTS

| Re. 15,290 | 2/1922 | Kemper | 24/115 L |
|---|---|---|---|
| 1,139,595 | 5/1915 | Starr | 24/136 A |
| 1,271,912 | 7/1918 | Kemper | 403/393 X |
| 1,811,942 | 6/1931 | Kemper et al. | 24/136 A |
| 2,387,436 | 10/1945 | Frank | 403/314 |
| 2,983,012 | 5/1961 | Madden | 403/393 |
| 3,927,441 | 12/1975 | Anzini | 24/136 A |
| 4,216,568 | 8/1980 | Anderson | 24/136 A |
| 4,935,993 | 6/1990 | Bree | 403/314 X |

FOREIGN PATENT DOCUMENTS

| 2360802 | 3/1978 | France. | |
|---|---|---|---|
| 367094 | 5/1974 | Sweden. | |
| 185235 | 9/1922 | United Kingdom | 24/136 A |

Primary Examiner—Peter M. Cuomo
Attorney, Agent, or Firm—Trexler, Bushnell, Giangiorgi & Blackstone, Ltd.

[57] ABSTRACT

A connector for wires comprises a body (20) having through passage (21) adapted to receive a pair of oppositely directed wire end portions (22A, 22B) in close lengthwise relationship with each other, channels (23A, 23B) within the body (20) one to each side of the through passage acutely inclined to and, at their inner ends, breaking into the through passage, and wedge structure (24A, 24B) within the channels adapted upon attempted withdrawal of either of the wire end portions (22A, 22B) from the through passage (21) to urge the wires therebetween forcibly towards each other, whereby friction secures them firmly in the connector. The wedge structure (24A, 24B) consists of balls (25A, 25B) and springs (26A, 26B), and the body (20) is formed by two die-castings (20X, 20Y) secured together by integral projections (27) on one body part (20X) riveted after passing through holes in the other part (20Y), twin bores (21A, 21B) of the through passage (21) and the channels (23A, 23B) being formed by grooves in the mating faces (28X, 28Y) of the body parts (20X, 20Y).

15 Claims, 6 Drawing Sheets

CONNECTOR FOR WIRES

This invention relates to a connector for wires or the like, e.g., cables or strands, and more particularly—but not exclusively—for connecting together lengths of wire fencing, e.g., by connecting together corresponding line wires, or fencing wires, e.g., of any stock fence.

An object of the invention is to provide a connector enabling wires to be connected together without being twisted, braided or welded.

Another object is to provide a compact connector enabling wires to be connected together in close alignment.

Another object is to provide a connector not requiring use of any tools or at least any special or custom made tools.

Another object is to provide a connector affording a tensile strength greater than that of most fence wires.

Another object is to provide a connector enabling adjustment of tension in the wires being connected.

Another object is to provide a connector particularly suitable for use with high tensile wires.

Another object is to provide a re-usable connector for wires or the like.

Another object is to provide a connector adapted for use with different and/or differing diameters of wires or the like.

Another object is to provide an electrically conductive connector particularly suitable for use in electric fences or with electric cables.

Another object is to provide a single, durable connector capable of withstanding extremes of weather conditions.

According to the present invention, a connector for wires or the like comprises a body having through passage means adapted to receive a pair of oppositely directed wire end portions in close lengthwise relationship with each other, channels within the body one to each side of the through passage means acutely inclined to and, at their inner ends, breaking into the through passage means, and wedge means within the channels adapted upon attempted withdrawal of either of the wire end portions from the through passage means to urge the wires therebetween forcibly towards each other, whereby friction secures them firmly in the connector.

The wires or the like can be pushed into the connector and/or pulled from their ultimate ends to whatever extent is needed to ensure the requisite tension when the wires or the like ease back to be gripped by the wedge means.

One size of connector may serve for two or more sizes of wire, depending on the size of the through passage means and the range of convergence of the wedge means, or two or more sizes of connector in accordance with the invention may be provided for individual wire sizes.

The wedge means preferably comprises a pair of balls (or rollers) guided within the channels, together with springs urging the balls (or rollers) towards the through passage means.

The channel s m ay be provided within a plastics moulding, and the springs may consist of integral bows of plastics having their free ends pushing the balls (or rollers) towards the through passage means. The body could be a one-piece plastics moulding with the through passage means and channels for the balls (or rollers) included therein, and the balls (or rollers) could also be form ed of plastics. Alternatively, the body could be a seamless metal sleeve, e.g. of stainless steel or other non-corrosive metal, of flattened round section, with a moulded plastics insert having the through passage means inclined across the flattened section of the sleeve, the guide channels one from each end and opposite sides of the through passage means, and the integral spring bows; and the balls (or rollers) also formed of stainless steel (or other non-corrosive metal); w hereby when the connector is in use the wire end portions will be "sandwiched" by the stainless steel balls (or rollers) within the stainless steel sleeve. The spring bows may have projecting manual grip means (e.g., lateral tabs on the spring bows) to assist release of the balls (or rollers) to enable the wires to be disconnected, e.g., when dismantling or repairing a fence, and the connector may be re-used.

Again, the body may be formed from solid metal, with a through bore or twin bores forming the through passage means, and with blind bores forming the channels for the balls, the outer ends of the bores being closed by plugs (e.g., screw plugs) after coil compression springs have been inserted behind the balls.

However, the body is preferably formed by two metal parts, e.g., die-castings, with securing means consisting of integral projections on the mating face of one body part fitting corresponding holes in the other body part and being secured therein, as by being a force-fit or by riveting, e.g., hot or cold riveting, or welding of the ends of the projections, or by bonding therein. Several projections and holes are preferably provided, being disposed outwardly of each channel with respect to the through passage means. The projections and holes may be round or lozenge-shaped or otherwise elongate cross-section generally in the lengthwise direction of the channels. Obviously, separate rivets could be used.

The through passage means preferably consists of twin bores (which are obviously formed by pairs of grooves in the mating faces of the body parts), and the end of each bore through which a wire end can be inserted preferably diverges outwardly to facilitate insertion of a wire end. The twin bores may merge where the channels break into the through passage means, to enable the wires to be forced into contact with each other; or the twin bores m ay be separated by wall portions, which may be capable of localised distortion, to increase the frictional contact with the wires under the urge of the balls (or rollers) and/or allow the wires to come into contact with each other.

Abutments for the springs may be blind ends of smaller diameter portions of further bores (which likewise are formed by pairs of grooves in the mating faces of the body parts) forming the channels and in the larger diameter portions of which are guided the balls.

Areas of the outsides and/or the mating faces of the body parts not adjacent or occupied by grooves may be relieved to save material and weight.

Connectors in accordance with the present invention can also be used to advantage in electric fencing, barbed wire fencing (i.e., on end lengths free of barbs), electric cables, suspension cables, and also as wire tensioners (e.g., in vineyards, or on strapping or binding wire) in which case a loop of wire is formed by passing the wire one way through such a connector, round a post (or package or bundle), and back through the connector, whereafter pulling of the free end of the wire away from the post (or pulling of both ends of the wire) and simultaneous pushing of the connector towards the post (or package or bundle) will result in tensioning of the wire.

A preferred embodiment of the invention and a number f alternative embodiments will now be described, by way of example only, with reference to the accompanying drawings, in which.

Figure 4:
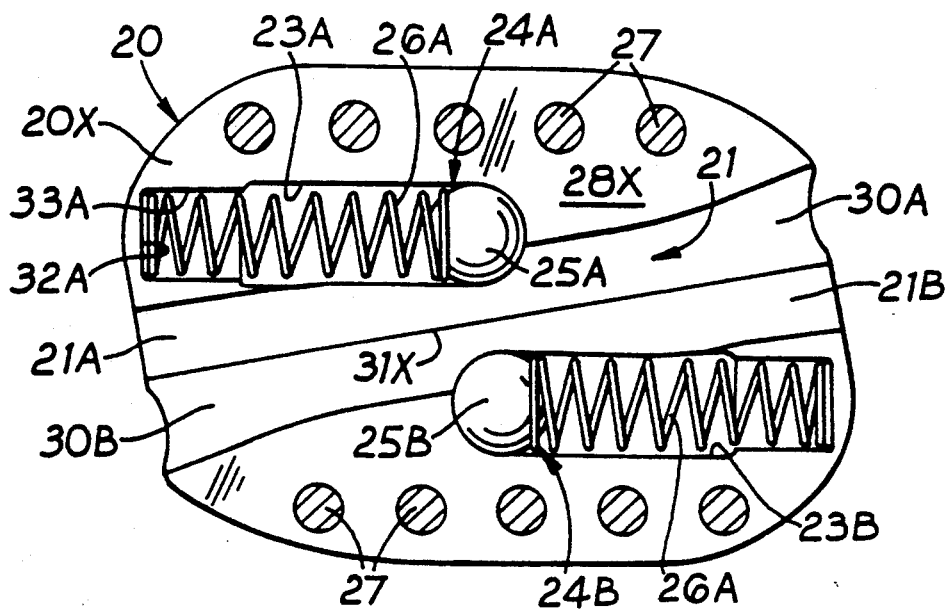
FIG. 4 is a section on the line IV—IV of FIG. 3.
Figure 5:
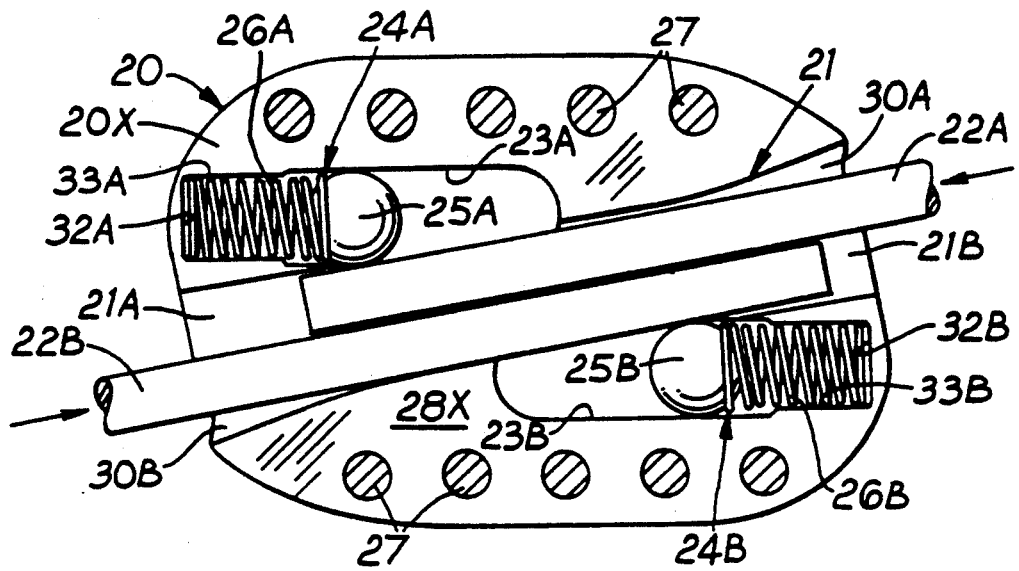
Figure 6:
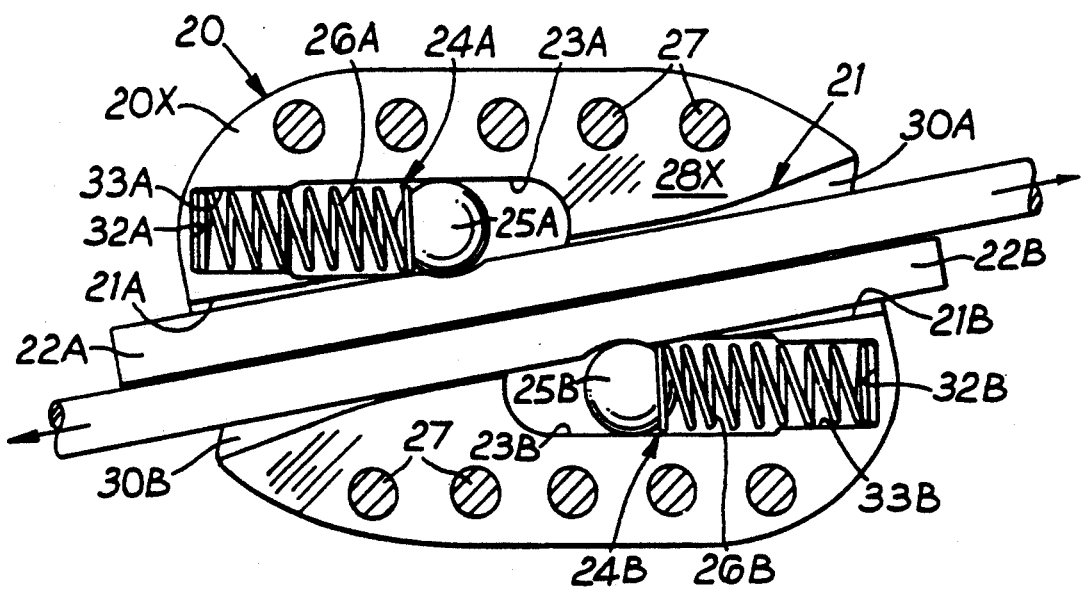
Figure 7:
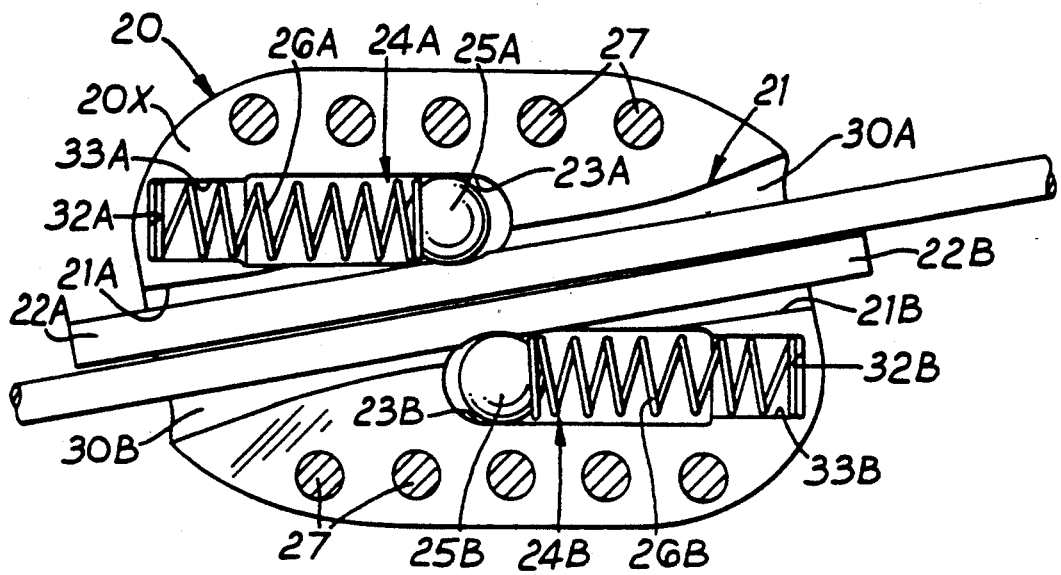
Figure 8:
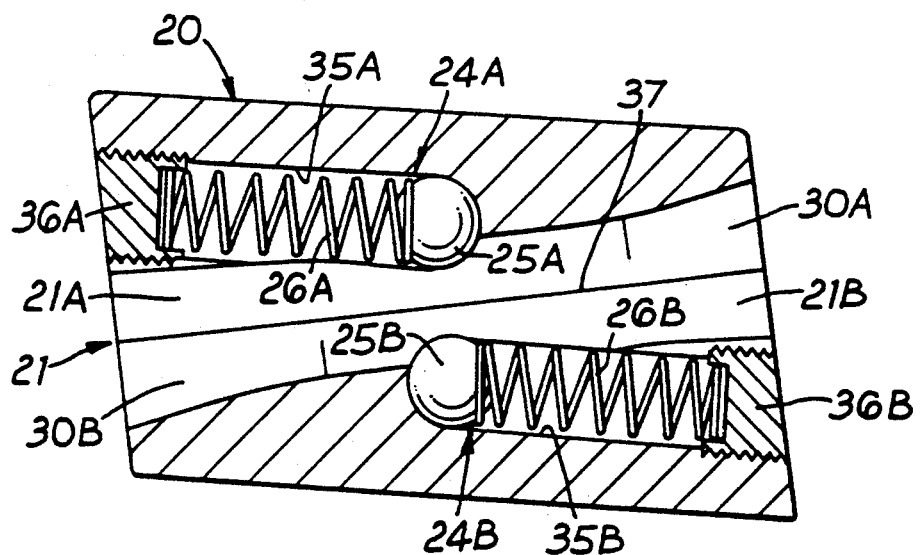
Figure 9:
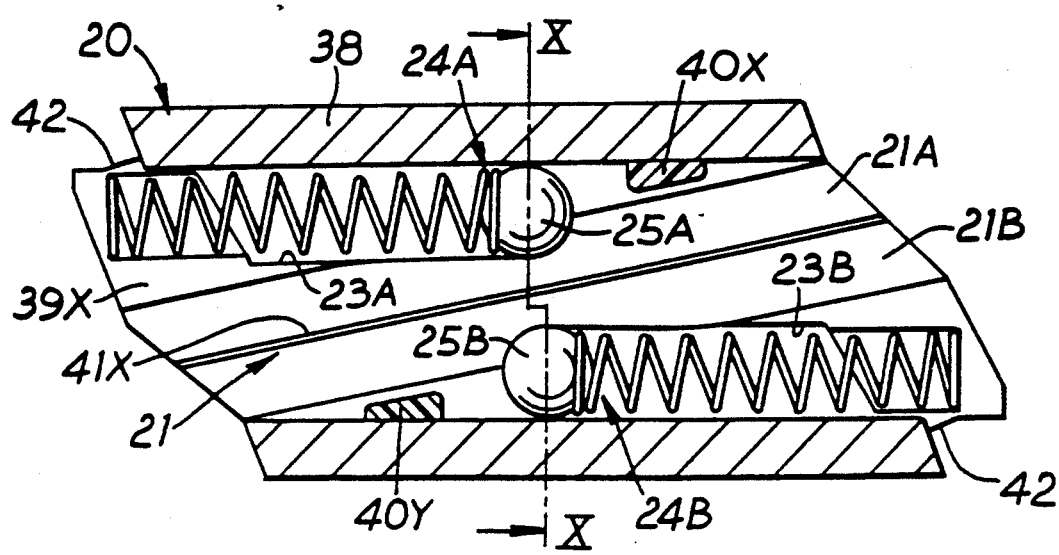
Figure 10:
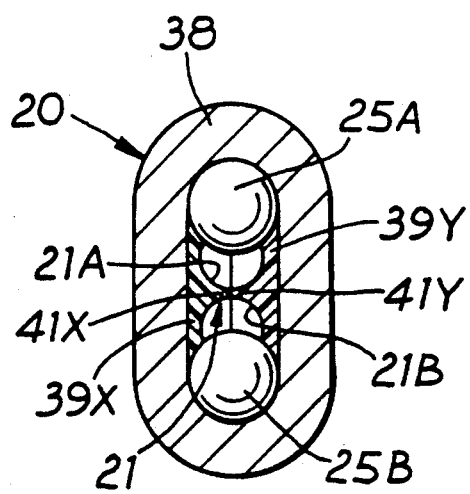
Figure 11:
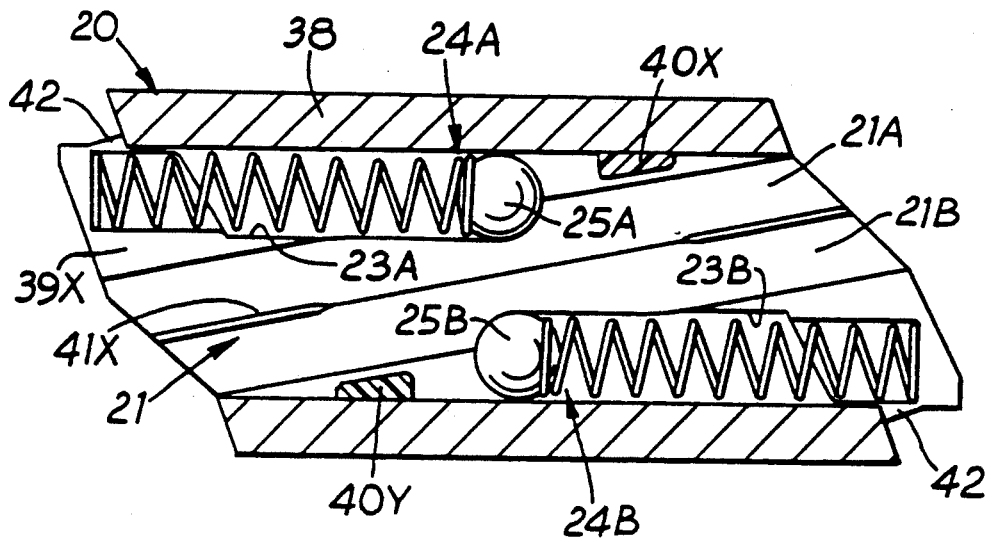
Figure 12:
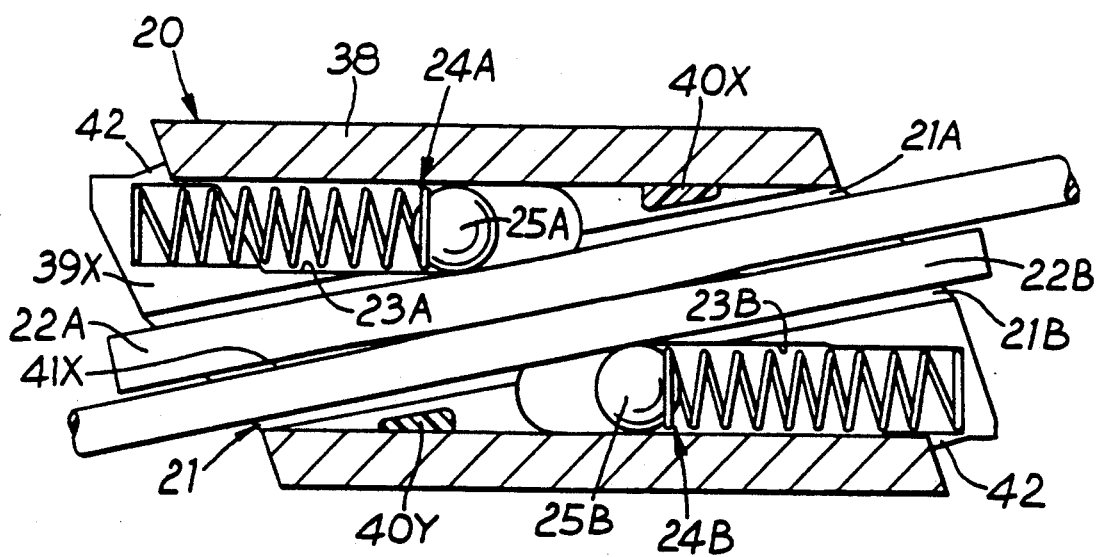
Figure 13:
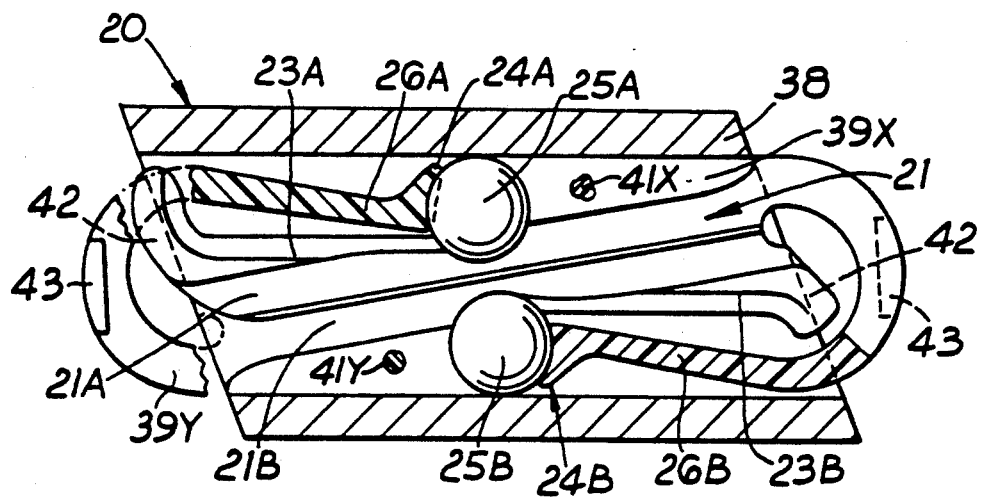
Figure 14:
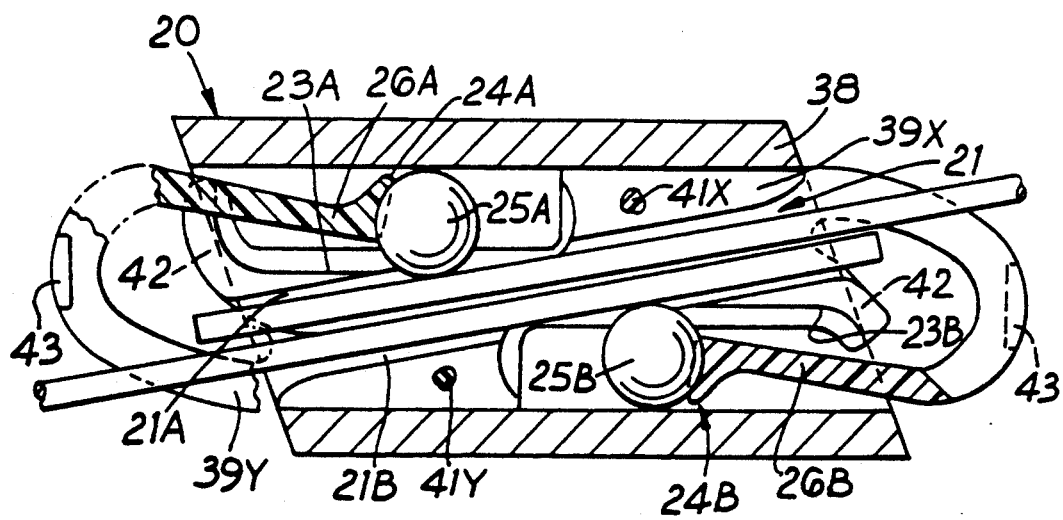

FIG. 5 corresponds to FIG. 4 but shows the connector after the insertion of wires to be connected;

FIG. 6 corresponds to FIG. 5 but shows the effect of tension in the wires;

FIG. 7 corresponds to FIG. 6 but shows the connector in use with smaller diameter wires than those in FIGS. 5 and 6;

FIG. 8 corresponds to FIG. 4 but shows a first alternative embodiment of the invention;

FIG. 9 also corresponds to FIG. 4 but shows a second alternative embodiment of the invention;

FIG. 10 is a section on the line X—X of FIG. 9;

FIG. 11 corresponds to FIG. 9 but shows a modification thereof;

FIG. 12 corresponds to FIG. 11 but shows the modified connector after insertion of wires; and FIGS. 13 and 14 correspond to FIGS. 4 and 5 but show a third alternative embodiment of the invention.

In FIGS. 1 to 4, a connector for wires (or the like) comprises a body 20 having through passage means 21 adapted to receive a pair of oppositely directed w ire end portions 22A, B in close lengthwise relationship with each other (see, FIG. 5), channels 23A, 23B within the body one to each side of the through passage means acutely inclined to and, at their inner ends, breaking into the through passage means, and wedge means 24A, 24B within the channels adapted upon attempted withdrawal of either of the wire end portions from the through passage means (see FIG. 6) to urge the wires therebetween forcibly towards each other, whereby friction secures them firmly in the connector.

The wedge means 24A, 24B comprises a pair of balls 25A, 25B, together with springs 26A, 26B urging the balls towards the through passage means 21.

Figure 1:
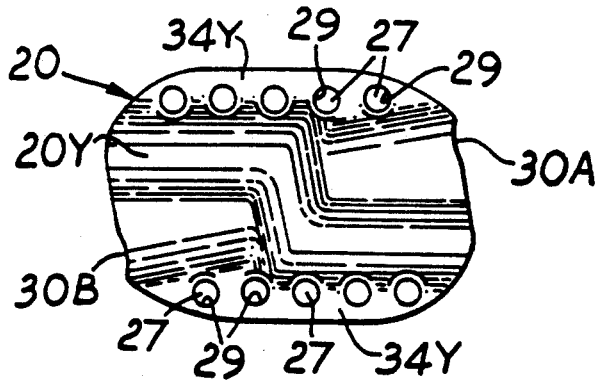
FIG. 1 is a side elevation of the preferred embodiment.
Figure 2:
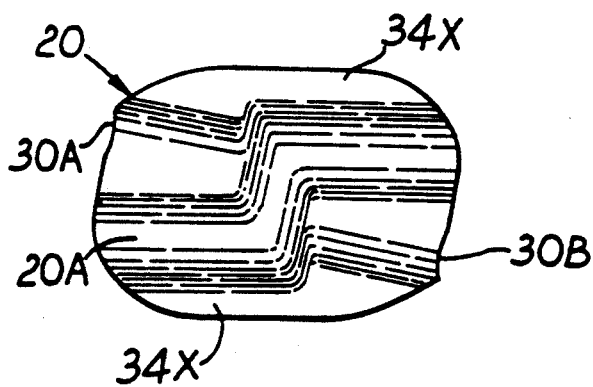
FIG. 2 is an elevation of the opposite side of the preferred embodiment.
Figure 3:
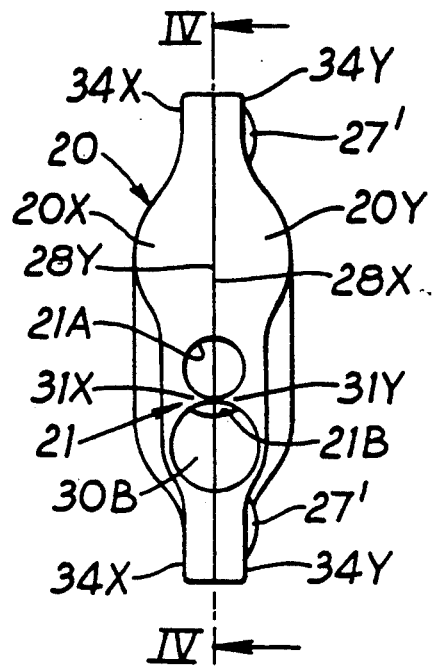
FIG. 3 is an enlarged elevation from the left hand end of FIG. 1.

The body 20 is formed by two die-cast parts 20X, 20Y with securing means consisting of integral projections 27 on the mating face 28X of one body part fitting corresponding holes 29 in the other body part and being secured therein, as by riveting of the ends of the projections, as indicated at 27' in FIG. 3, and the through passage means consists of twin bores 21A, 21B (which are obviously formed by pairs of grooves in the mating surfaces 28X, 28Y), and the end 30A, 30B of each bore through which a wire end 22A, 22B can be inserted diverges outwardly to facilitate insertion of a wire end. The twin bores 21A, 21B are separated by wall portions 31X, 31Y which may be capable of localised distortion to increase the frictional contact with the wires and/or allow the wires to come into contact with each other.

Abutments 32A, 32B for the springs 26A, 26B are blind ends of smaller diameter portions 33A, 33B of further bores (which likewise are formed by pairs of grooves in the mating faces 28X, 28Y of the body parts 20X, 20Y) forming the channels 23A, 23B in the larger diameter portions of which are guided the balls 25A, 25B.

Areas 34X, 34Y of the outsides of the body parts 20X, 20Y not adjacent the grooves are relieved to save material (see particularly FIG. 3).

The balls 25A, 25B may, as shown in FIG. 6, even indent the wires 22A, 22B if they are of lesser hardness than the balls.

In FIG. 7 wires 22A, 22B are shown of much smaller diameter than the bores 21A, 21B (i.e., smaller than the wires in FIGS. 5 and 6), the intersection of the channels 23A, 23B with the bores 21A, 21B respectively allowing the balls to take up appropriate positions closer to each other and in wedging contact with the wires.

In FIG. 8 the body 20 is formed from solid metal with twin bores 21A, 21B forming the through passage means 21, and with blind bores 35A, 35B forming channels for the balls 25A, 25B, the outer ends of the bores being closed by screw plugs 36A, 36B after springs 26A, 26B have been inserted behind the balls. A wall portion 37 is shown left between the twin bores 21A, 21B, but they may merge over the length of the intersections with the blind bores 35A, 35B.

In FIGS. 9 and 10 the body 20 is a seamless metal sleeve 38 of flattened round section, with a two-part moulded plastics insert 39X, 39Y having the through passage means 21 (consisting of twin bores 21A, 21B separated by wall portions 40X, 40Y) inclined across the flattened section of the sleeve, the two parts of the insert being provided with interlocking projections 41X, 41Y and lugs 42 engaging the ends of the sleeve. In FIGS. 11 and 12 the twin bores 21A, 21B merge, at least over the length where the channels break into the through passage means 21, to enable inserted wires 22A, 22B (see FIG. 12) to be forced into contact with each other, whereby the wires are "sandwiched" by the balls within the sleeve.

Finally, in FIGS. 13 and 14 the body 20 is again a Seamless metal sleeve 38 of flattened round section, with a two-part moulded plastics insert 39X, 39Y with interlocking projections 41X, 41Y and lugs 42 engaging the ends of the sleeve. However, the balls 25A, 25B are urged towards the through passage means 21 by spring bows 26A, 26B integral with the insert parts 41Y and 41X respectively, and the spring bows have lateral tabs 43 forming manual grip means to assist release of the balls to enable the wires 22A, 22B to be disconnected, and enabling the connector to be re-used.

We claim:

1. A connector for wires comprising a body having through passage means adapted to receive a pair of oppositely directed wire end portions, channels within the body disposed one to each side of the through passage means and acutely inclined to and, at their inner ends, breaking into the through passage means, and wedge means within the channels adapted upon attempted withdrawal of either of the wire end portions from the through passage means to urge the wires therebetween forcibly towards each other and thus secure the wires firmly in the connector, characterized in that the through passage means consists of twin bores in close lengthwise relationship with each other, and adapted to receive the pair of oppositely directed wire end portions, one in each bore, whereby the wedge means within the channels are adapted upon attempted withdrawal of either of the wire end portions from the respective bore to urge said wire into frictional engagement with said bore.

2. A connector as in claim 1, characterised in that the wedge means comprises a pair of balls guided within the channels, together with springs urging the balls towards the through passage means.

3. A connector as in claim 1, characterised in that the wedge means comprises a pair of rollers guided within the channels, together with springs urging the rollers towards the through passage means.

4. A connector as in claim 2 or claim 3, characterized in that the channels are provided within a plastics moulding.

5. A connector as in claim 4, characterised in that the body is a seamless metal sleeve of flattened round section, with a moulded plastics insert having the through passage means inclined across the flattened section of the sleeve.

6. A connector as in claim 2 or claim 3, characterised in that the body is formed with securing means consisting of integral projections on the mating face of one body part fitting corresponding holes in the other body part and being secured therein.

7. A connector as in claim 6 characterised in that abutments for the springs are blind ends of smaller diameter portions of further bores forming the channels and in the larger diameter portions of which are guided the balls.

8. A connector as in claim 2, characterized in that the body is formed from solid metal blind bores forming the channels for the balls, the outer ends of the bores being closed by plugs after coil compression springs have been inserted behind the balls.

9. A connector as in claim 1, characterised in that the end of each bore through which a wire end can be inserted diverges outwardly to facilitate insertion of a wire end.

10. A connector for wires comprising a body having through passage means adapted to receive a pair of oppositely directed wire end portions, channels within the body disposed one to each side of the through passage means and acutely inclined to and, at their inner ends, breaking into the through passage means, and wedge means within the channels adapted upon attempted withdrawal of either of the wire end portions from the through passage means to urge the wires therebetween forcibly towards each other and thus secure the wires firmly in the connector, characterized in that the through passage means consists of twin bores in close lengthwise relationship with each other, and adapted to receive the pair of oppositely directed wire end portions, one in each bore, whereby the wedge means within the channels are adapted upon attempted withdrawal of either o the wire end portions from the respective bore to urge said wire into frictional engagement with said bore, wherein said channels are provided within a plastics moulding and said wedge means comprises a pair of balls guided within the channels, together with springs urging the balls towards the through passage means and the springs consist of integral bows of plastics having their free ends pushing the balls towards the through passage means.

11. A connector as in claim 10, characterised in that the spring bows have projecting manual grip means to assist release of the balls to enable the wires to be disconnected.

12. A connector for wires comprising a body having through passage means adapted to receive a pair of oppositely directed wire end portions, channels within the body disposed one to each side of the through passage means and acutely inclined to and, at their inner ends, breaking into the through passage means, and wedge means within the channels adapted upon attempted withdrawal of either of the wire end portions from the through passage means to urge the wires therebetween forcibly towards each other and thus secure the wires firmly in the connector, characterized in that the through passage means consists of twin bores in close lengthwise relationship with each other, and adapted to receive the pair of oppositely directed wire end portions, one in each bore, and the twin bores merge where the channels break into them to enable the wires to be forced into contact with each other, whereby the wedge means within the channels are adapted upon attempted withdrawal of either of the wire end portions from the respective bore to urge said wire into frictional engagement with said bore.

13. A connector for wires comprising a body having through passage means adapted to receive a pair of oppositely directed wire and portions, channels within the body disposed one to each side of the through passage means and acutely inclined to and, at their inner ends, breaking into the through passage means, and wedge means within the channels adapted upon attempted withdrawal of either of the wire end portions from the through passage means to urge the wires therebetween forcibly towards each other and thus secure the wires firmly in the connector, characterized in that the through passage means consists of twin bores in close lengthwise relationship with each other, and adapted to receive the pair of oppositely directed wire end portions, one in each bore, whereby the wedge means within the channels are adapted upon attempted withdrawal of either of the wire end portions from the respective bore to urge said wire into frictional engagement with said bore, wherein the twin bores are separated by wall portions, which are capable of localised distortion, to increase the frictional contact with the wires under the urge of the wedge means and/or allow the wires to come into contact with each other.

14. A connector for wires comprising a body having through passage means adapted to receive a pair of oppositely directed wire end portions, channels within the body disposed one to each side of the through passage means and acutely inclined to and, at their inner ends, breaking into the through passage means, and wedge means within the channels adapted upon attempted withdrawal of either of the wire end portions from the through passage means to urge the wires therebetween forcibly towards each other and thus secure the wires firmly in the connector, characterized in that the through passage means consists of twin bores in close lengthwise relationship with each other, and adapted to receive the pair of oppositely directed wire end portions, one in each bore, whereby the wedge means within the channels are adapted upon attempted withdrawal of either of the wire end portions from the respective bore to urge said wire into frictional engagement with said bore, wherein said channels are provided within a plastics moulding and said wedge means comprises a pair of rollers guided within the channels, together with springs urging the rollers towards the through passage means and the springs consist of integral bows of plastics having their free ends pushing the rollers towards the through passage means.

15. A connector as in claim 14 characterised in that the spring bows have projecting manual grip means to assist release of the rollers to enable the wires to be disconnected.

* * * * *